US011996760B2

(12) United States Patent
Saviers et al.

(10) Patent No.: US 11,996,760 B2
(45) Date of Patent: May 28, 2024

(54) AIRCRAFT ELECTRIC MOTOR HAVING A STATOR HEAT PIPE COOLING SCHEME

(71) Applicant: Hamilton Sundstrand Corporation, Charlotte, NC (US)

(72) Inventors: Kimberly Rae Saviers, Glastonbury, CT (US); Abbas A. Alahyari, Glastonbury, CT (US); Jagadeesh Kumar Tangudu, South Windsor, CT (US); Joseph Turney, Amston, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 180 days.

(21) Appl. No.: 17/519,766

(22) Filed: Nov. 5, 2021

(65) Prior Publication Data

US 2023/0143600 A1 May 11, 2023

(51) Int. Cl.
*H02K 9/22* (2006.01)
*B64D 27/24* (2006.01)
(Continued)

(52) U.S. Cl.
CPC ............. *H02K 9/225* (2021.01); *B64D 27/24* (2013.01); *B64D 33/08* (2013.01); *H02K 5/203* (2021.01);
(Continued)

(58) Field of Classification Search
CPC ............ H02K 9/225; H02K 9/20; H02K 1/20; H02K 3/47; H02K 11/33; H02K 5/203; H02K 21/22; B64D 27/24; B64D 33/08
(Continued)

(56) References Cited

U.S. PATENT DOCUMENTS

| 6,762,525 B1 * | 7/2004 | Maslov | H02K 1/2791 310/216.023 |
| 10,199,907 B2 | 2/2019 | Lin et al. | |
| (Continued) | | | |

FOREIGN PATENT DOCUMENTS

| CN | 112104167 A | 12/2020 |
| EP | 3490116 A2 | 5/2019 |
| JP | 6622509 B2 | 11/2019 |

OTHER PUBLICATIONS

European Search Report for European Application No. 22193785.7; dated Apr. 24, 2023; 8 pages.

*Primary Examiner* — Michael Andrews
(74) *Attorney, Agent, or Firm* — CANTOR COLBURN LLP

(57) ABSTRACT

Aircraft electric motors are described. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system. The cooling system includes an oscillating heat pipe containing a first working fluid, wherein the oscillating heat pipe is arranged to pick up heat from at least one winding, the oscillating heat pipe having an evaporator section arranged in thermal contact with the at least one winding and a condenser section arranged away from the evaporator section and a heat pickup portion arranged to receive a second working fluid to remove heat from the condenser section of the oscillating heat pipe.

20 Claims, 11 Drawing Sheets

(51) Int. Cl.
  *B64D 33/08* (2006.01)
  *H02K 5/20* (2006.01)
  *H02K 9/20* (2006.01)
  *H02K 11/33* (2016.01)
  *H02K 21/22* (2006.01)

(52) U.S. Cl.
  CPC ............... *H02K 9/20* (2013.01); *H02K 11/33* (2016.01); *H02K 21/22* (2013.01)

(58) Field of Classification Search
  USPC ........................................ 310/54, 216.023
  See application file for complete search history.

(56) References Cited

U.S. PATENT DOCUMENTS

| | | |
|---|---|---|
| 10,277,096 B2 | 4/2019 | Bodla et al. |
| 2017/0141654 A1 | 5/2017 | Bodla et al. |
| 2017/0244306 A1 | 8/2017 | Lin et al. |
| 2017/0355568 A1* | 12/2017 | Schmidt ................... H02K 9/02 |
| 2019/0291570 A1* | 9/2019 | Tang ...................... B60K 11/04 |
| 2020/0027588 A1* | 1/2020 | Lobscheid ............... H02K 7/06 |
| 2021/0107664 A1* | 4/2021 | Rabbi ...................... H02K 7/14 |

\* cited by examiner

AIRCRAFT ELECTRIC MOTOR HAVING A STATOR HEAT PIPE COOLING SCHEME

STATEMENT OF FEDERAL SUPPORT

This invention was made with government support under Contract No. DE-AR0001351 awarded by the U.S. Department of Energy. The government has certain rights in the invention.

BACKGROUND

The present disclosure relates to electric motors, and more particularly, to electric motor assemblies with high efficiency and power density with a light weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a motor unit having a rotor and a stator, wherein the stator includes a plurality of windings and cooling channels arranged to provide cooling to the plurality of windings, a drive unit configured to drive operation of the motor unit, and a cooling system. The cooling system includes an oscillating heat pipe containing a first working fluid, wherein the oscillating heat pipe is arranged to pick up heat from at least one winding, the oscillating heat pipe having an evaporator section arranged in thermal contact with the at least one winding and a condenser section arranged away from the evaporator section and a heat pickup portion arranged to receive a second working fluid to remove heat from the condenser section of the oscillating heat pipe.

In addition to one or more of the features described herein, or as an alternative, further embodiments of the aircraft electric motors may include a cold plate, wherein the heat pickup portion is part of the cold plate.

In addition to one or more of the features described herein, or as an alternative, further embodiments of the aircraft electric motors may include that the cold plate comprises one or more heat dispersion elements arranged to thermally interact with the second working fluid.

In addition to one or more of the features described herein, or as an alternative, further embodiments of the aircraft electric motors may include that the heat dispersion elements comprise at least one of fins and pedestals.

In addition to one or more of the features described herein, or as an alternative, further embodiments of the aircraft electric motors may include that the heat pick up portion comprises at least one cooling channel formed within the cold plate and configured to receive the second working fluid.

In addition to one or more of the features described herein, or as an alternative, further embodiments of the aircraft electric motors may include a pump configured to pump the second working fluid through the at least one cooling channel formed within the cold plate.

In addition to one or more of the features described herein, or as an alternative, further embodiments of the aircraft electric motors may include a heat exchanger fluidly coupled to the at least one cooling channel formed within the cold plate, the heat exchanger configured to receive the second working fluid to remove heat therefrom.

In addition to one or more of the features described herein, or as an alternative, further embodiments of the aircraft electric motors may include that the cold plate is configured to structurally support at least a portion of the stator.

In addition to one or more of the features described herein, or as an alternative, further embodiments of the aircraft electric motors may include that the oscillating heat pipe is integrally formed with the cold plate as a unitary structure.

In addition to one or more of the features described herein, or as an alternative, further embodiments of the aircraft electric motors may include that the oscillating heat pipe is embedded within the at least one winding.

In addition to one or more of the features described herein, or as an alternative, further embodiments of the aircraft electric motors may include that the oscillating heat pipe is arranged as an in-slot structure arranged adjacent to and in thermal contact with the at least one winding.

In addition to one or more of the features described herein, or as an alternative, further embodiments of the aircraft electric motors may include a motor housing arranged about the stator, wherein the heat pickup portion is part of the motor housing.

In addition to one or more of the features described herein, or as an alternative, further embodiments of the aircraft electric motors may include that the evaporator section of the oscillating heat pipe is arranged within the stator and the condenser section is arranged within the motor housing.

In addition to one or more of the features described herein, or as an alternative, further embodiments of the aircraft electric motors may include that the windings are arranged in a U-shape configuration.

In addition to one or more of the features described herein, or as an alternative, further embodiments of the aircraft electric motors may include that the motor unit comprises rotor having U-shaped magnets arranged about the windings of the stator.

In addition to one or more of the features described herein, or as an alternative, further embodiments of the aircraft electric motors may include that the cooling system further includes a header and a heat exchanger configured to supply the second working fluid to the heat pickup portion.

In addition to one or more of the features described herein, or as an alternative, further embodiments of the aircraft electric motors may include that the rotor and stator are arranged in an annular configuration.

In addition to one or more of the features described herein, or as an alternative, further embodiments of the aircraft electric motors may include that the first working fluid is a saturated refrigerant.

In addition to one or more of the features described herein, or as an alternative, further embodiments of the aircraft electric motors may include that the first working fluid is a dielectric refrigerant.

In addition to one or more of the features described herein, or as an alternative, further embodiments of the aircraft electric motors may include that the dielectric refrigerant is a hydrofluorocarbon (HFC), a hydrofluro-olefin (HFO), or a hydrofluoroether (HFE).

According to some embodiments, aircraft electric motors are provided. The aircraft electric motors include a motor unit having a rotor and a stator, wherein the stator includes a plurality of windings and cooling channels arranged to provide cooling to the plurality of windings, a means for driving operation of the motor unit, and a cooling system. The cooling system includes an oscillating heat pipe containing a first working fluid, wherein the oscillating heat pipe is arranged to pick up heat from at least one winding, the oscillating heat pipe having an evaporator section arranged in thermal contact with the at least one winding and a condenser section arranged away from the evaporator section and a means for heat pickup arranged to receive a second working fluid to remove heat from the condenser section of the oscillating heat pipe.

In addition to one or more of the features described herein, or as an alternative, further embodiments of the aircraft electric motors may include that the means for driving operation of the motor unit comprises at least one power module system, and the means for heat pickup comprises a cold plate.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
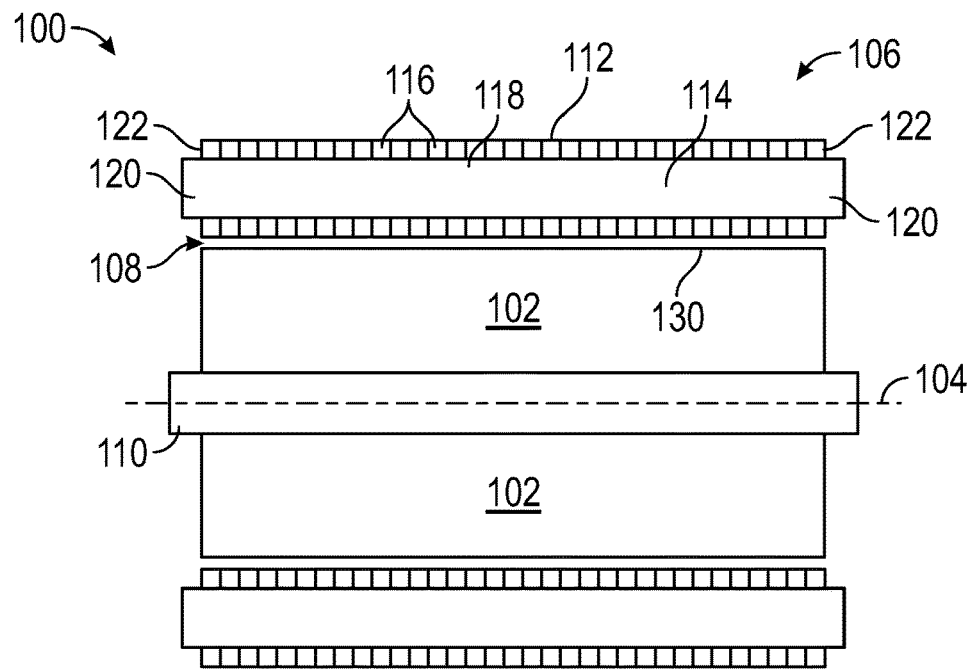
FIG. 1A is a partial view of an embodiment of electric motor.
Figure 1B:
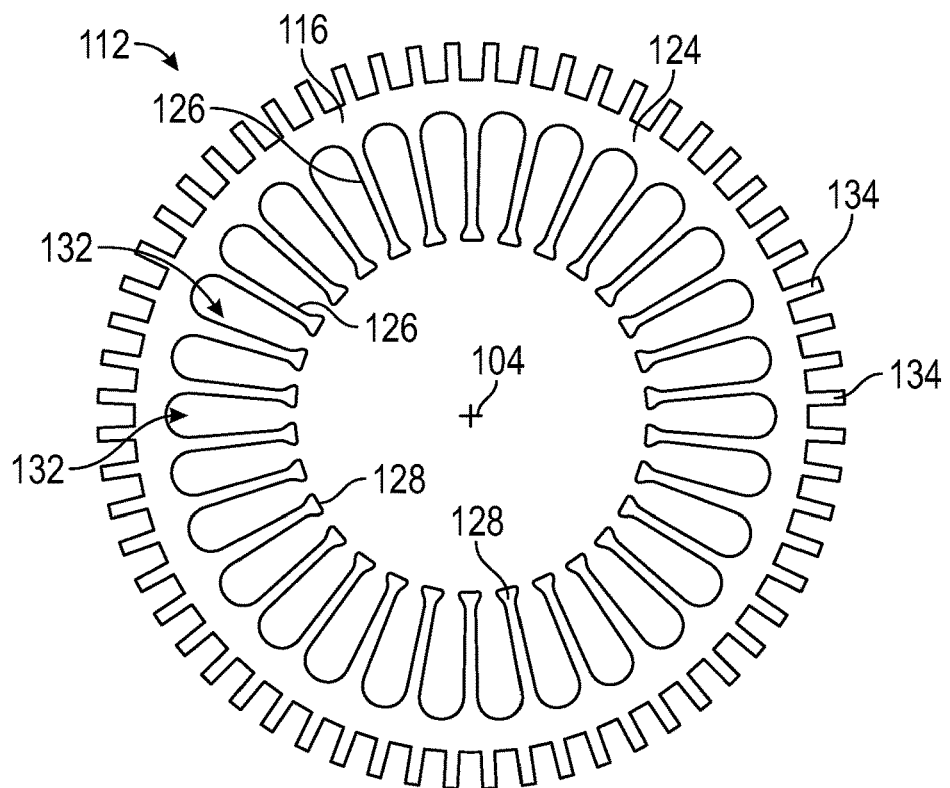
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system.

Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
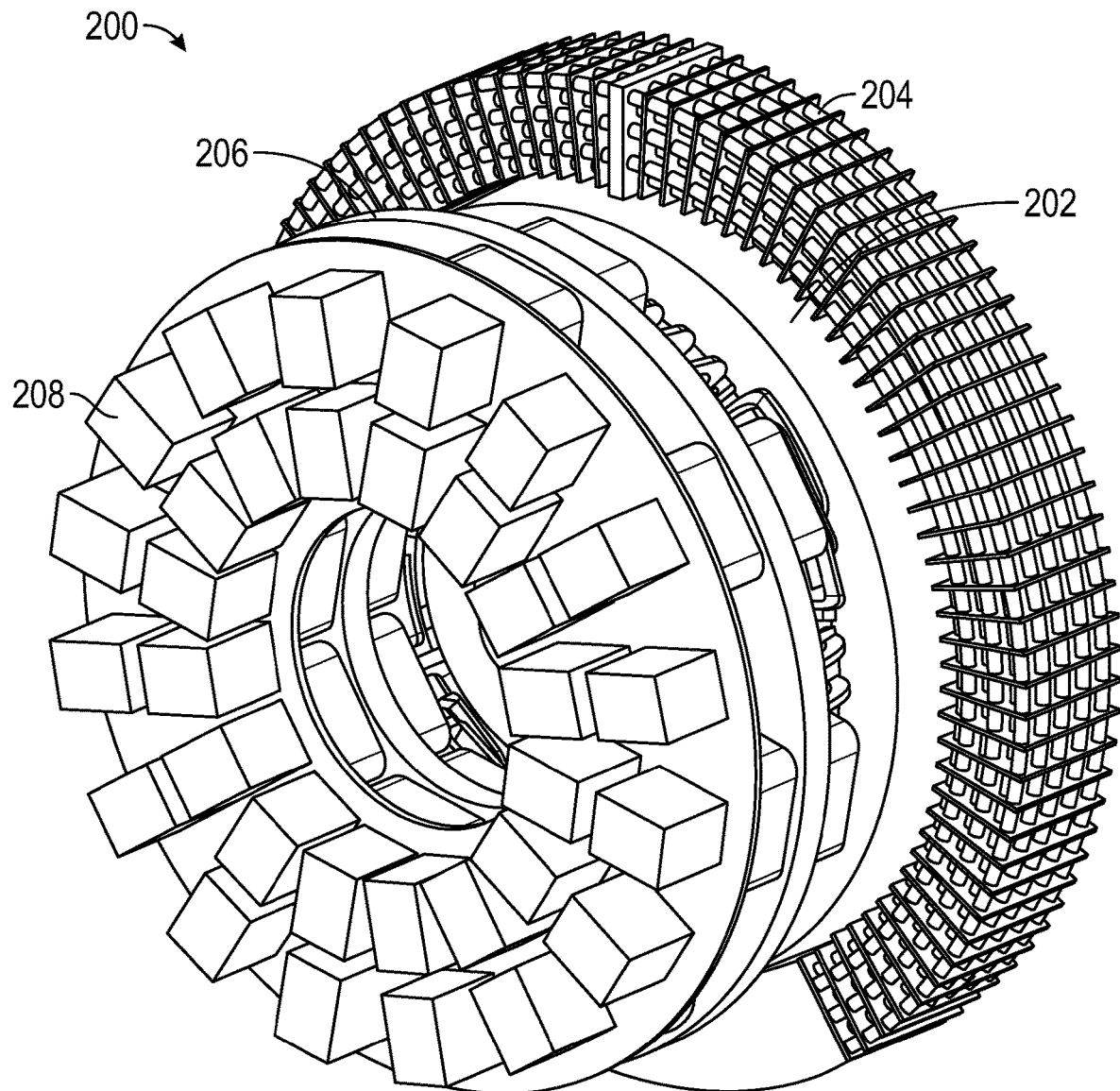
FIG. 2A is a schematic illustration of an aircraft electric motor in accordance with an embodiment of the present disclosure.
Figure 2B:
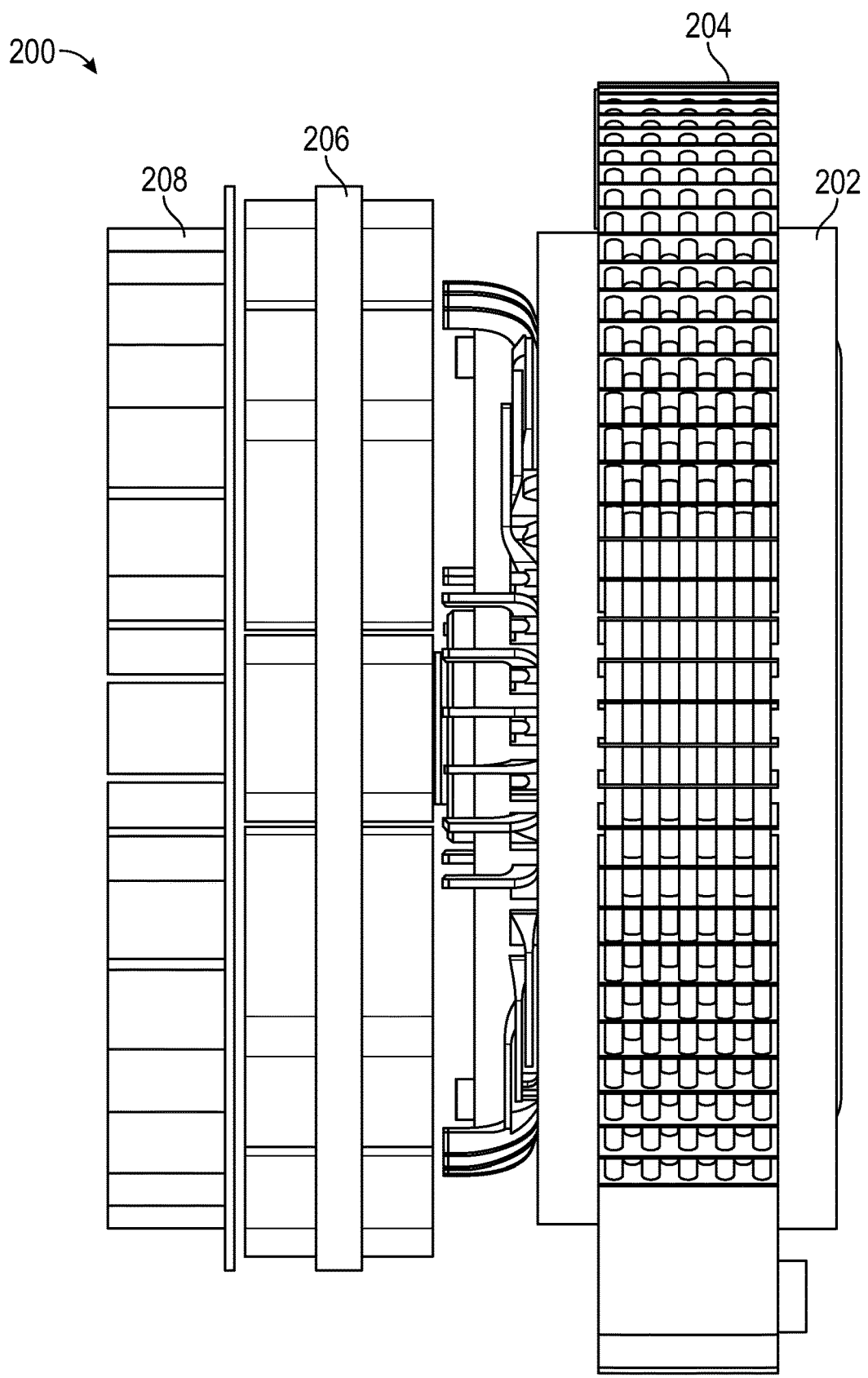
FIG. 2B is a side elevation view of the aircraft electric motor of FIG. 2A.
Figure 2C:
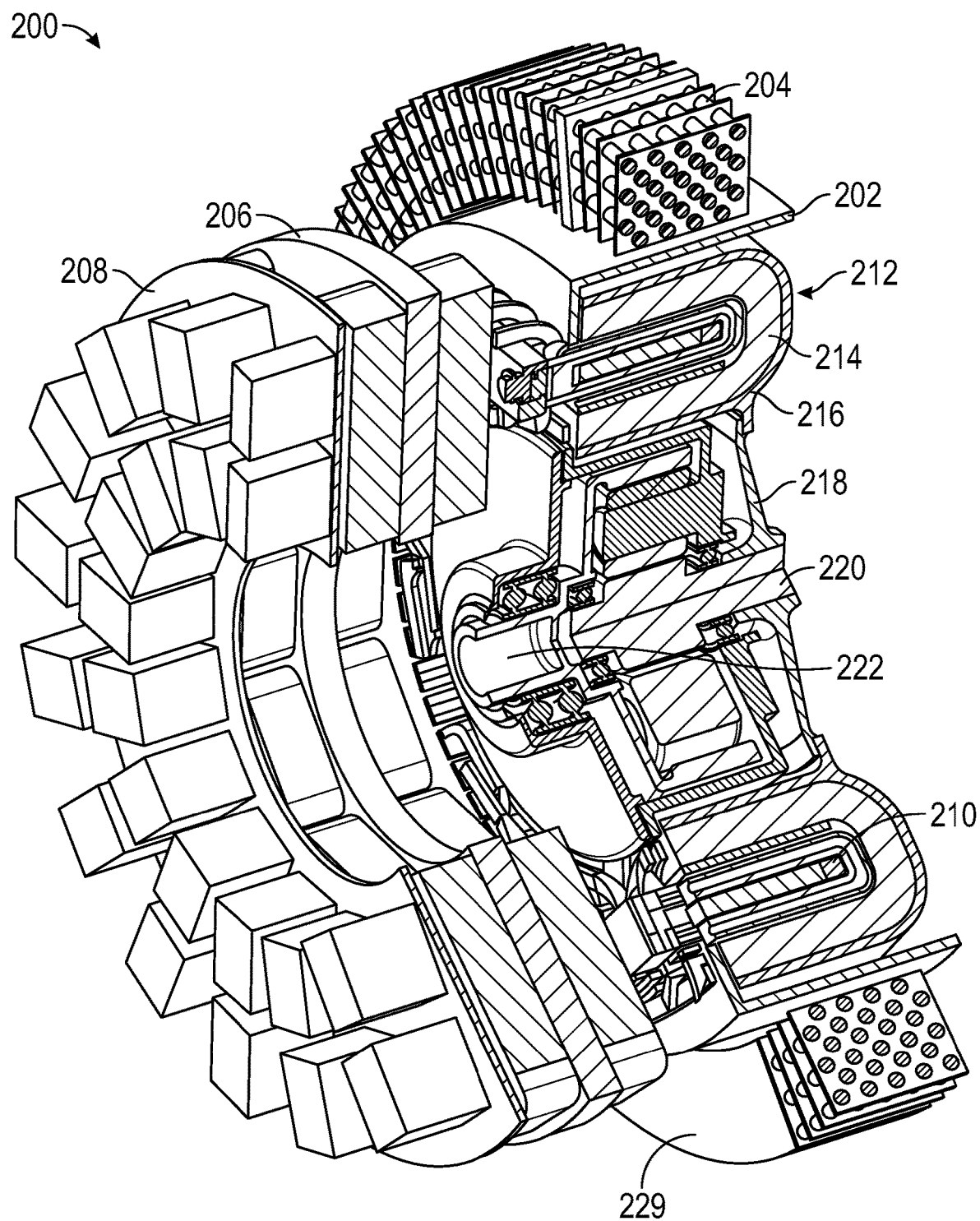
FIG. 2C is a partial cut-away illustration of the aircraft electric motor of FIG. 2A.
Figure 2D:
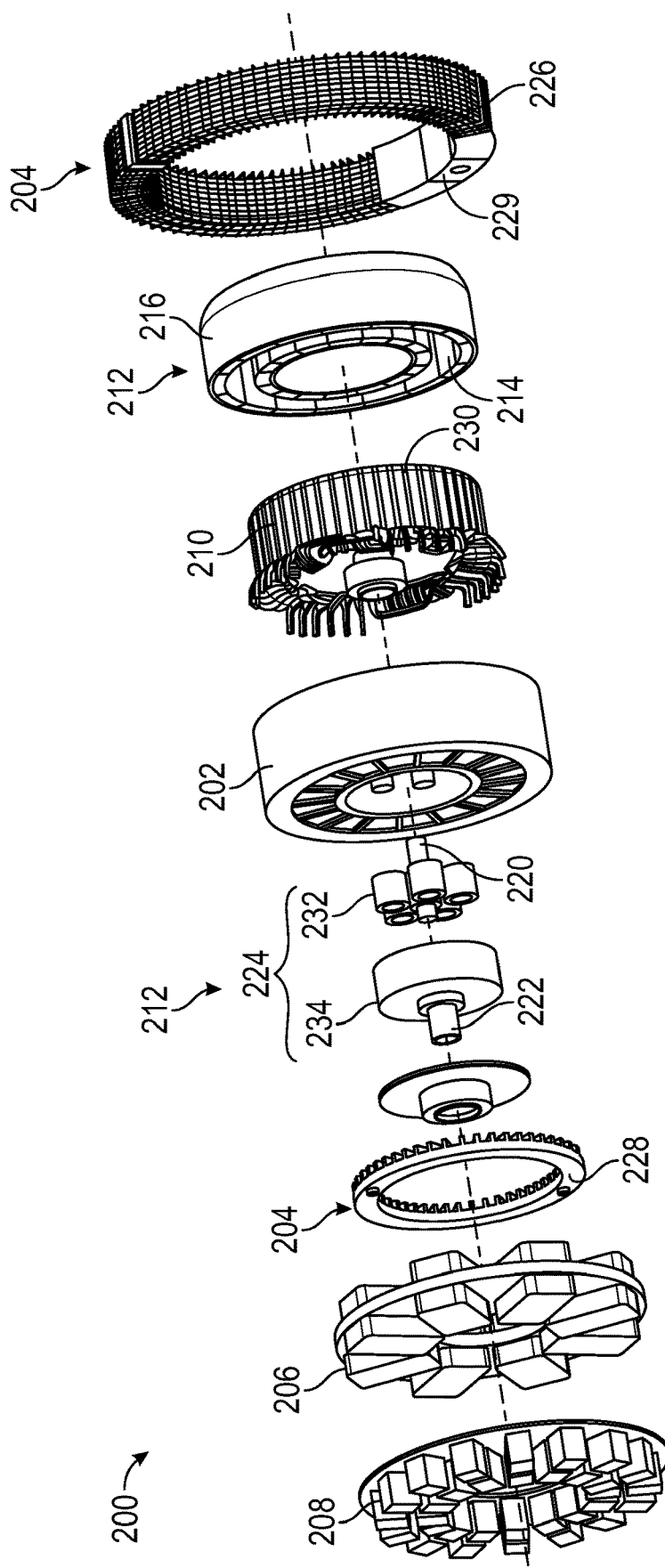
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208, which may form, in part, a drive unit of the aircraft electric motor 200. The first and second power module systems 206, 208 can include capacitors and other electronics, including, but not limited to, printed circuit boards (PCBs) that may enable control and operation of the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
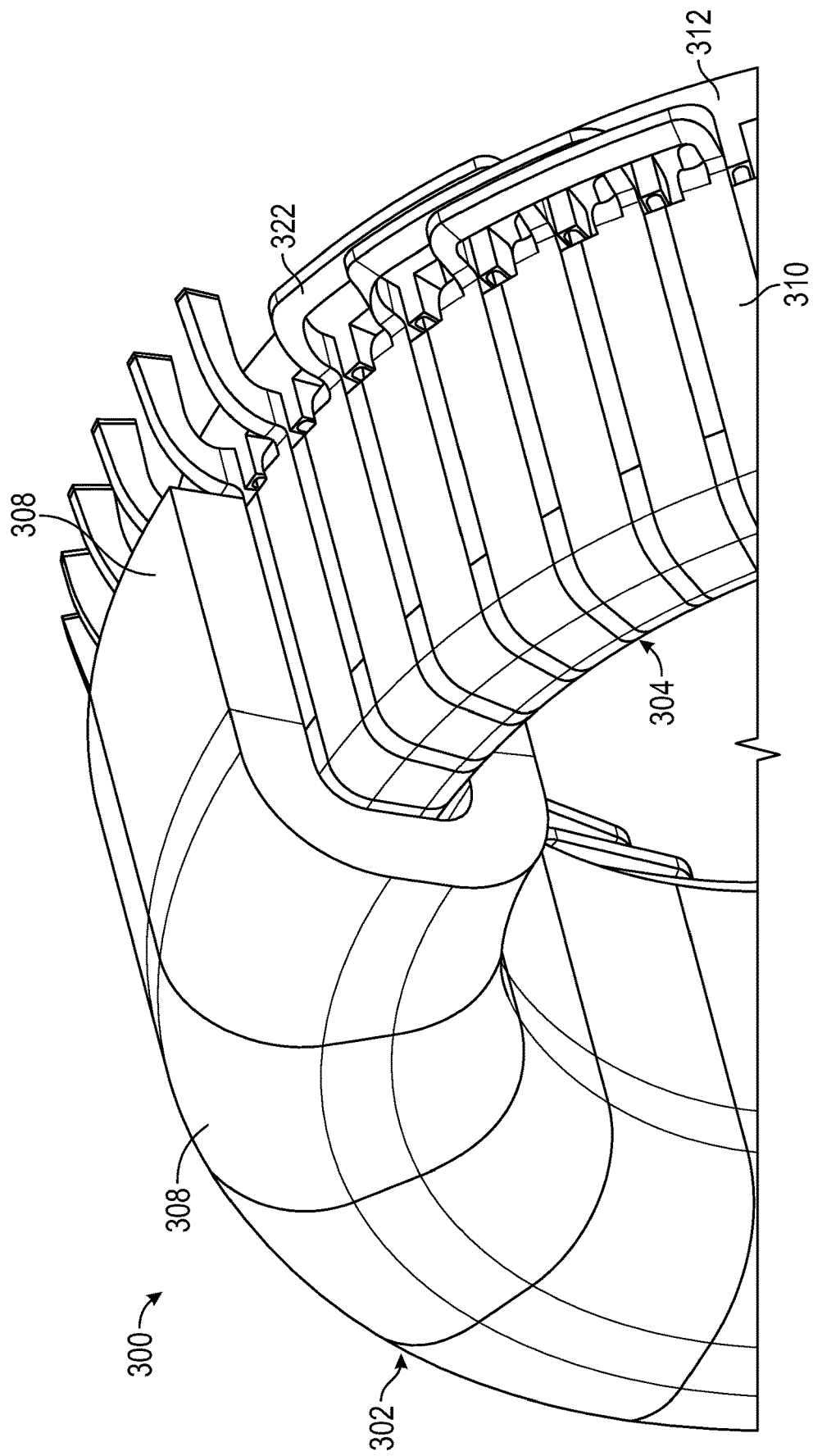
FIG. 3A is a schematic illustration of a rotor and stator of an aircraft electric motor in accordance with an embodiment of the present disclosure.
Figure 3B:
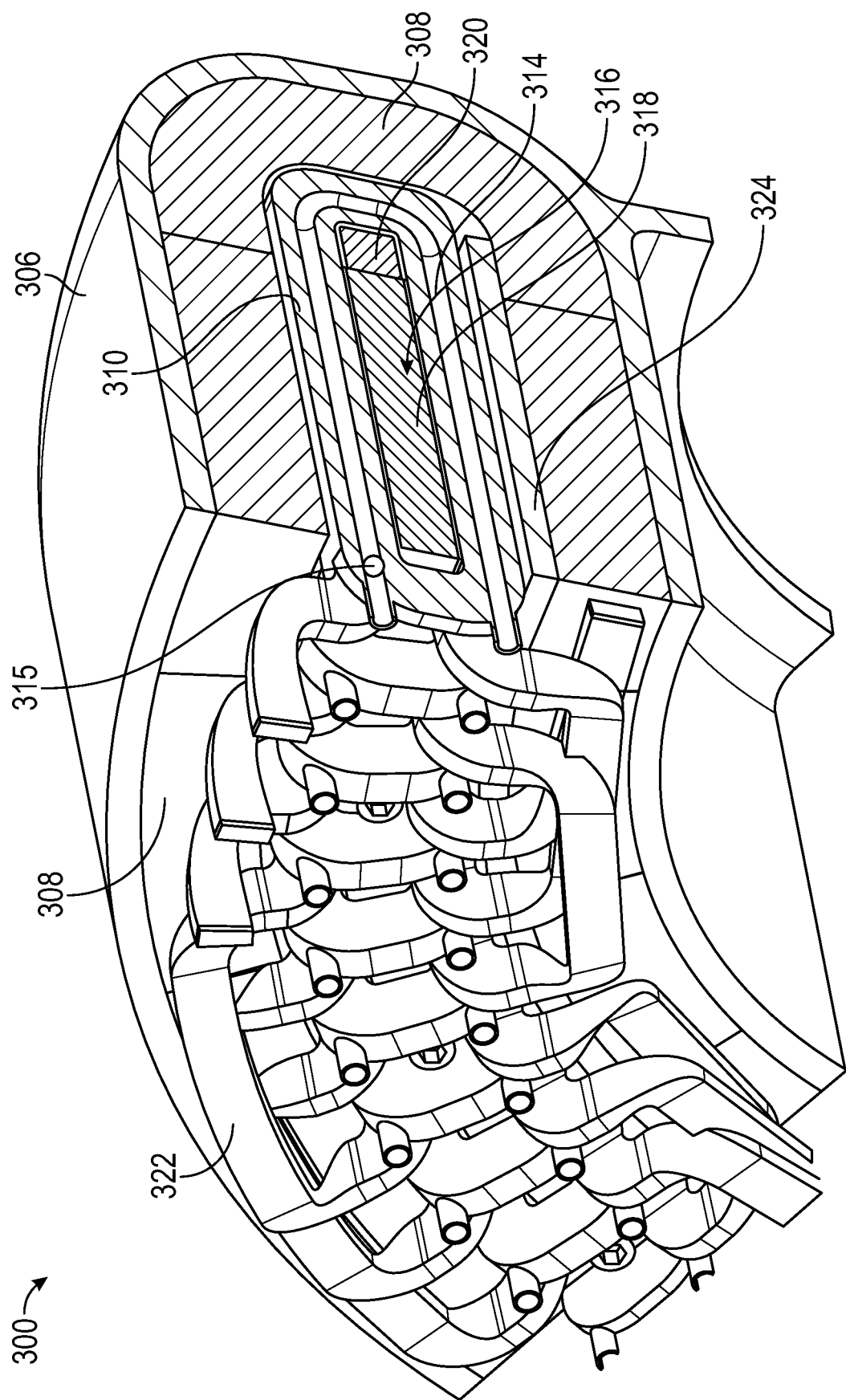
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular or annular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B. As shown in FIG. 3B, the cooling channels 314 may include a flow restrictor 315 arranged at an inlet side (or an outlet side) of the cooling channel 314. The flow restrictor 315 may be used to throttle the flow of a cooling fluid to provide efficient cooling within the cooling channels 314. The cooling fluid may be a saturated refrigerant (e.g., dielectric refrigerants including, but not limited to, hydrofluorocarbons (HFC), hydrofluro-olefins (HFO), and/or hydrofluoroethers (HFE)).

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 310 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

High-power-density aviation-class electric motor and drives may require advanced cooling technologies. These machines are generally thermally limited at high power ratings and their performance can be improved by mitigating thermal limitations. In-slot cooling is an approach to directly cool the motor windings in the slot, leading to lower temperatures, and ultimately higher power density motors. However, manufacturing complexity arises when connecting many small parallel flow channels on one face of the motor.

In accordance with some embodiments of the present disclosure, in-slot cooling is achieved with oscillating heat pipes (OHPs) having an integrated cold plate to provide local cooling to the motor windings with less complexity than individual flow channels. Further, in accordance with embodiments of the present disclosure, a main fluid loop may have less pressure drop as compared to a configuration with fluid routed directly into slot channels. This has a system-level impact in that a pump and/or rejecting heat exchanger can be smaller and/or lighter in weight as compared to prior systems. In one non-limiting example, the OHPs are located in the motor slots, while an integrated cold plate is located externally to the motor slots. For example, the cold plate may be positioned at the axial face of the motor. During operation, the OHP (evaporator section of OHP) picks up heat inside of the motor windings. The heat is rejected at the cold plate side (condenser section of OHP). In some embodiments, the cold plate is integrated with a fluid loop to cool the condenser side of the OHP. In other embodiments, the cold plate section may take the form of a finned heat sink to be cooled with air. Such a system may be passively cooled. For example, passive cooling may employ air movement that is already present in a local environment. As such, in some embodiments, no power input is required to the system for the purpose of cooling and there may be few or no moving parts. As such reliability benefits may be realized in addition to improved cooling. In other configurations, a fan may be used to propel air over a heat sink, therefore introducing power input and moving parts.

Figure 4:
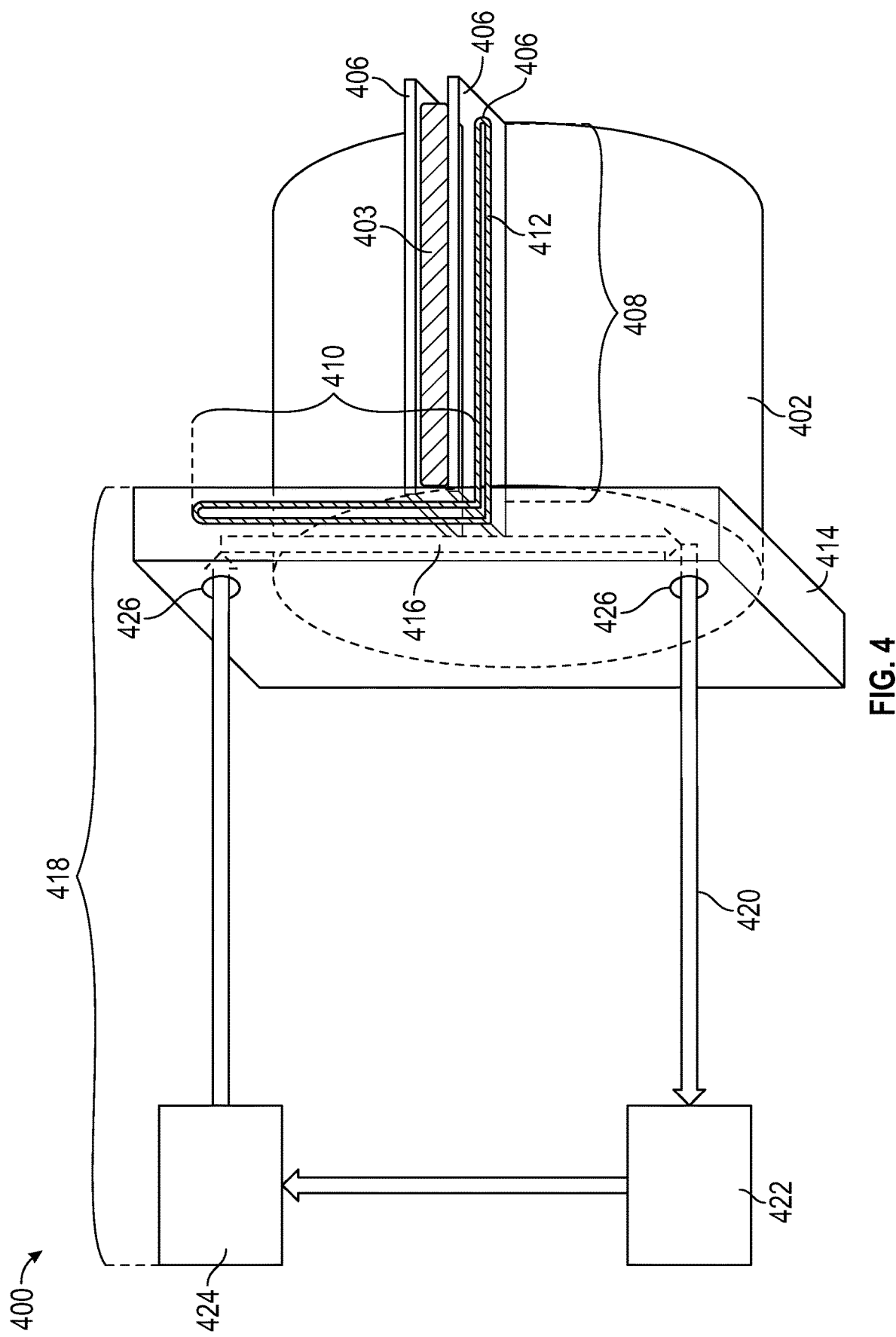
FIG. 4 is a schematic illustration of a portion of an aircraft electric motor system in accordance with an embodiment of the present disclosure.

Turning now to FIG. 4, a schematic illustration of a portion of an aircraft electric motor 400 in accordance with an embodiment of the present disclosure is shown. The aircraft electric motor 400 may be similar to that shown and described above, with components omitted for clarity and brevity of discussion. In FIG. 4, the aircraft electric motor 400 includes a stator 402 illustrating a single winding 403 (e.g., one winding 310 as shown in FIGS. 3A-3B). It will be appreciated that FIG. 4 is merely illustrative, and the stator 402 may include numerous windings arranged in an annular or circular structure, as shown and described above. The stator 402 may be arranged relative to a rotor and configured to induce rotation of the rotor, as described above.

To provide cooling to the windings 403, each winding may be configured with one or more in-slot oscillating heat pipes 406 (in-slot OHP 406). Oscillating heat pipes (OHPs) use pressure-driven, two-phase fluid flow to rapidly transfer heat between heat sources and heat sinks. The in-slot OHP 406 includes an evaporator section 408 (e.g., evaporator portion or section) and a condenser section 410 (e.g., condenser portion or section) and contains a first working fluid 412 therein. The evaporator section 408 of the in-slot OHP 406 extends adjacent to the winding 403 (or between windings 403) and acquires heat from the windings 403 during operation of the aircraft electric motor 400. As a working fluid (e.g., two-phase fluid) within the in-slot OHP 406 picks up heat, the heat will be transferred through the evaporator section 408 to the condenser section 410 through the oscillations of the first working fluid 412 within the evaporator section 408 of the in-slot OHP 406.

The condenser section 410 of the in-slot OHP 406 extends into a cold plate 414. The heat of the in-slot OHP 406 is rejected from the condenser section 410 into the cold plate 414. The cold plate 414 includes the condenser section 410 of the in-slot OHP 406 and a heat pickup portion 416 of a cooling loop 418. The heat pickup portion 416 of the cooling loop 418 may be integrated into the cold plate 414. The heat pickup portion 416 may be formed of a plurality of channels formed in the cold plate 414 that contain a second working fluid 420. In some embodiments, the second working fluid may be a coolant or refrigerant, and in some such embodiments may be a single-phase fluid. In some embodiments, the first working fluid 412 within the OHP 406 may be, for example and without limitation, ethanol, acetone, perfluorinated compounds (PFCs), and/or methoxy-nonafluorobutane, etc. Further, in some embodiments for example, and without limitation, the second working fluid 420 may be air, water, ethylene- or propylene-glycol, water mixtures (e.g., EGW, PGW), or a phase-change refrigerant.

The cooling loop 418, in this embodiment, is an active cooling configuration. The second working fluid 420 picks up heat within the cold plate 414 from the condenser section 410 of the OHPs 406. A pump 422 is used to provide motive force and drive the second working fluid 420 through the cooling loop 418. The second working fluid 420 is pumped, using the pump 422, through a heat exchanger 424 arranged along the cooling loop 418. It will be appreciated that in other configurations, the pump may be downstream of the heat exchanger, and thus the illustrative configuration is not intended to be limiting. The heat exchanger 424 may be an air cooled heat exchanger, a fluid cooled heat exchanger, or the like. In some non-limiting embodiments, the heat exchanger 424 may be similar to the heat exchanger 226 shown in FIGS. 2A-2D. Heat within the second working fluid 420 is rejected at the heat exchanger 424 and then returned into the cold plate 414 to pick up heat from the condenser section 410 of the OHP 406.

In some embodiments, the in-slot OHPs 406 may be integrally formed with the cold plate 414. Similarly, at least the heat pickup portion 416 of the cooling loop 418 may also be integrally formed within the cold plate 414. As such, a single unitary structure may include the OHPs 406, the cold plate 414, and a portion of the cooling loop 418. In some embodiments, the pump 422 and the heat exchanger 424 may be fluidly coupled to the heat pickup portion 416 of the cooling loop 418 by one or more fluid ports 426 on the cold plate 414. The cold plate 414 may include many different condenser sections 410 of different OHPs 406 and a single heat pickup portion 416 of the cooling loop 418. In such a configuration, the heat pickup portion 416 may be formed of a flow channel or path that interweaves with the condenser sections 410 of the OHPs 406. In some embodiments, the integrally formed cold plate 414 and OHPs 406 may serve a secondary function of structural support. That is, the OHPs 406 extends into and between the windings 403 and provides support thereto. Moreover, the cold plate 414 may provide structural support to the stator 402. In accordance with some embodiments, the cold plate or heat sink can have different geometric profiles than that illustratively shown. For example, the in some embodiments, the cold plate may have a circle shape to match the shape of the motor. In some embodiments, the cold plate can include a hole, aperture, or open area in the center to make space for a motor shaft, motor end windings, and/or other motor components or associated components.

Although described as separate components, in some embodiments the OHPs may be integrally formed and embedded with the windings. That is, for example, the cooling channels 314 shown in FIG. 3B which are integral and part of the windings 310 may be filled with a two-phase OHP working fluid. In such a configuration, the end connections 322 may be replaced by the condenser section of the OHPs and the end connections 322 may be part of an integral with a cold plate.

Figure 5:
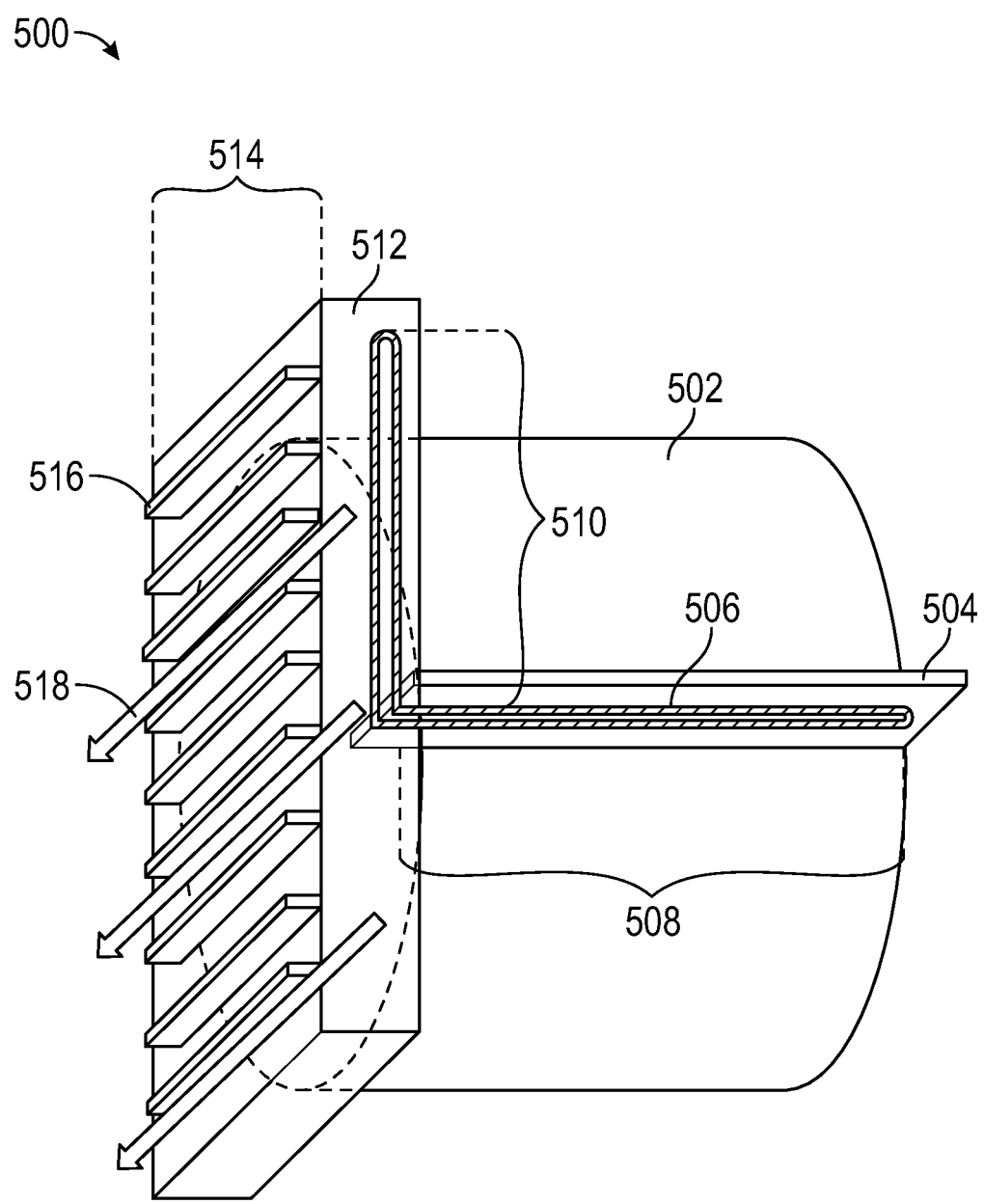
FIG. 5 is a schematic illustration of a portion of an aircraft electric motor system in accordance with an embodiment of the present disclosure.

Turning now to FIG. 5, a schematic illustration of a portion of an aircraft electric motor 500 in accordance with an embodiment of the present disclosure is shown. The aircraft electric motor 500 may be similar to that shown and described above, with components omitted for clarity and brevity of discussion. In FIG. 5, the aircraft electric motor 500 includes a stator 502 illustrating a OHP 504 (e.g., a winding with embedded channels or a separate OHP adjacent windings of the stator 502). It will be appreciated that FIG. 5 is merely illustrative, and the stator 502 may include numerous windings arranged in an annular or circular structure, as shown and described above. The stator 502 may be arranged relative to a rotor and configured to induce rotation of the rotor, as described above.

The OHP 504 includes a first working fluid 506 that oscillates within an evaporator section 508 to transfer heat to a condenser section 510 of the OHP 504. The condenser section 510 is part of and integral with a cold plate 512. In this embodiment, the cooling at the cold plate 512 is passive, as compared to the active pumping described with respect to the embodiment of FIG. 4. The condenser section 510 of the OHPs 504 extend into the cold plate 512 which includes a heat pickup portion 514. The heat pickup portion 514, of this embodiment, is formed of heat dispersion elements 516. The heat dispersion elements 516 may be formed as fins, pedestals, plates, dimples, roughness, or similar structures, textures, surface features, etc. that provide an increased surface area to enable heat pick up by a second working fluid 518. In this passive configuration, the second working fluid 518 may be air that is blown or convey over the heat dispersion elements 516 to remove heat from the heat pickup portion 514.

Figure 6A:
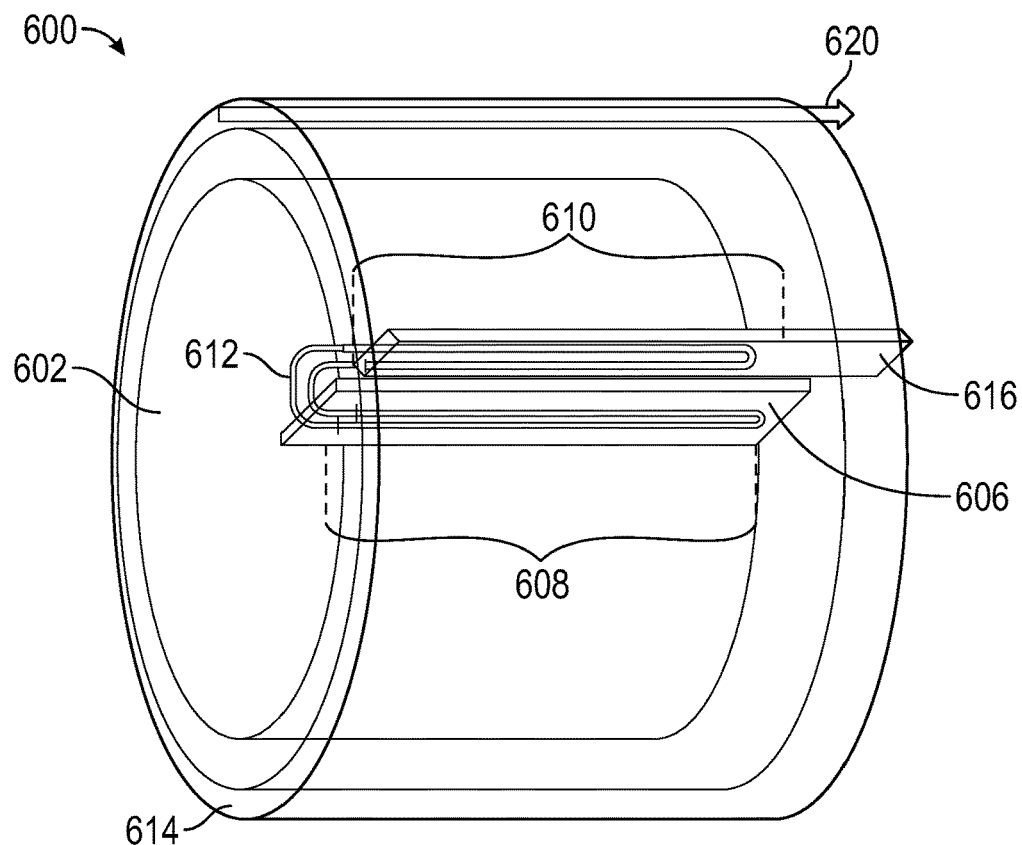
FIG. 6A is a schematic illustration of a portion of an aircraft electric motor system in accordance with an embodiment of the present disclosure.
Figure 6B:
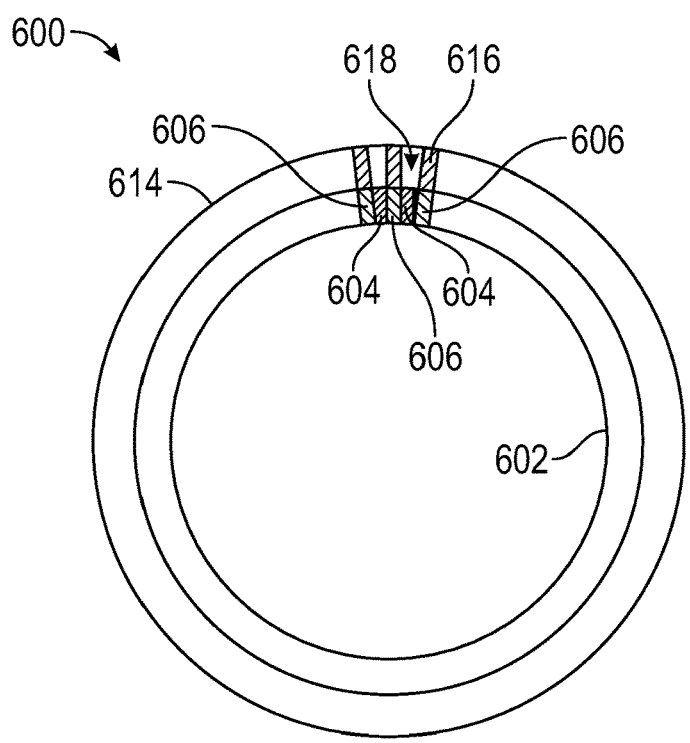
FIG. 6B is an alternative view of the portion of an aircraft electric motor system of FIG. 6A.

Turning now to FIGS. 6A-6B, schematic illustrations of a portion of an aircraft electric motor 600 in accordance with an embodiment of the present disclosure is shown. The aircraft electric motor 600 may be similar to that shown and described above, with components omitted for clarity and brevity of discussion. In FIGS. 6A-6B, the aircraft electric motor 600 includes a stator 602 having windings 604 (shown in FIG. 6B) arranged with OHPs 606 arranged relative thereto. As described above, in other embodiments, the OHPs may be formed as embedded channels within windings of the stator. It will be appreciated that FIGS. 6A-6B are merely illustrative, and the stator 602 may include numerous windings arranged in an annular or circular structure, as shown and described above. The stator 602 may be arranged relative to a rotor and configured to induce rotation of the rotor, as described above.

As shown in FIGS. 6A-6B, the OHPs 606 include an evaporator section 608 and a condenser section 610 with a first working fluid 612 arranged therein. In this embodiment, rather than a cold plate, the cooling of the first working fluid is provided through a motor housing 614. The motor housing 614, in this embodiment, includes heat pickup portions 616 which are arranged relative to slots 618 within the motor housing 614. A second working fluid 620 is passed through the slots 618 of the motor housing 614 to provide heat pick up and cool the first working fluid 612. The motor housing 614 may operate substantially similar to the cold plates described above and provide structural support to the aircraft electric motor 600 in addition to the cooling properties provided through inclusion of the OHPs 606. In the configuration illustrated in FIGS. 6A-6B, the cooling at the heat pickup portions 616 is passive and the second working fluid 620 (e.g., air) is passed through the slots 618. In other embodiments, the slots 618 may be omitted and replaced by an active cooling scheme, such as plates or fins with a refrigerant or coolant that is passed through such structures using a pump and heat exchanger configuration, similar to that shown and described with respect to FIG. 4.

Figure 7:
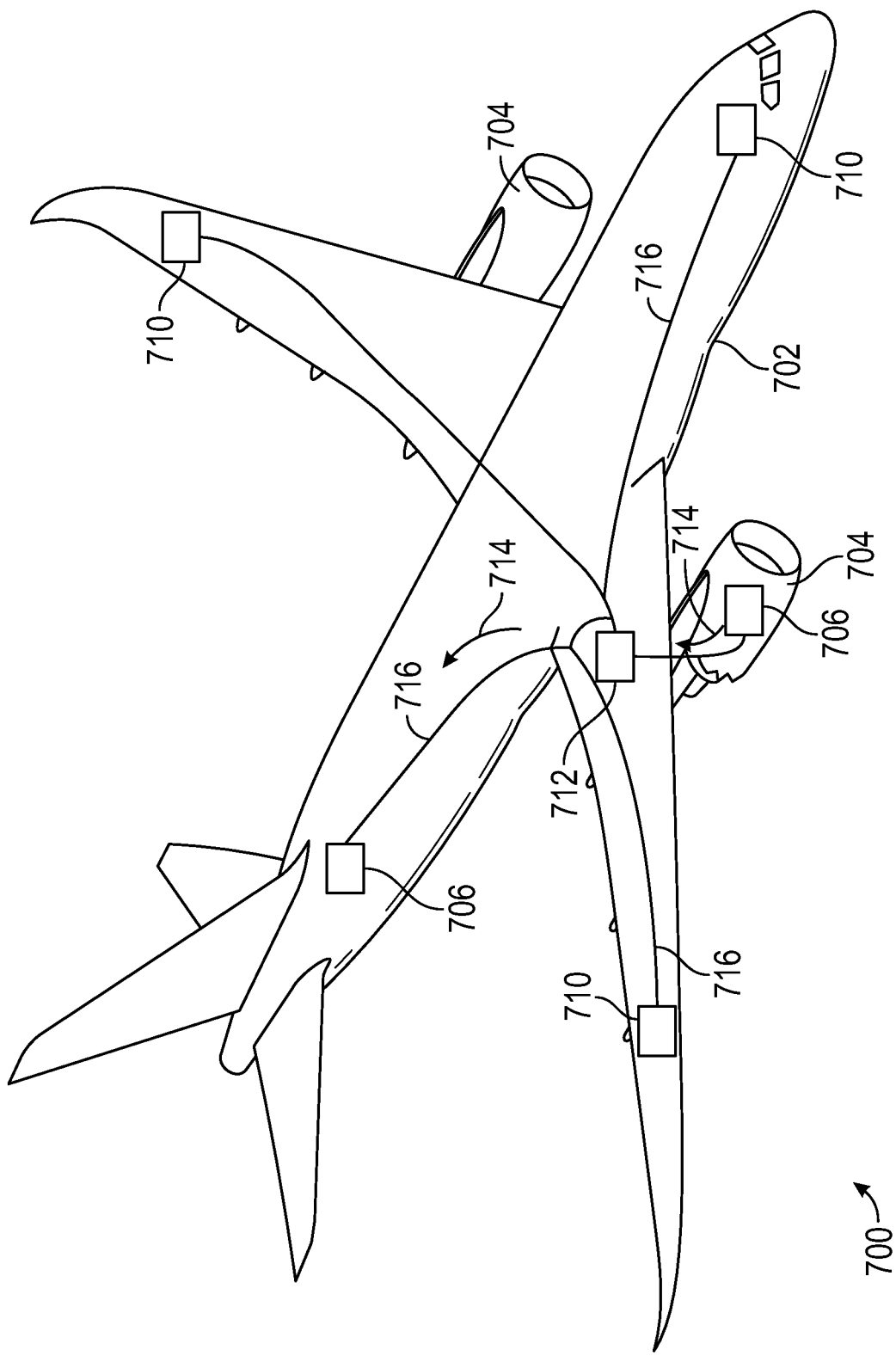
FIG. 7 is a schematic view of a power system of an aircraft that may employ embodiments of the present disclosure.

Referring now to FIG. 7, a power system 700 of an aircraft 702 is shown. The power system 700 includes one or more engines 704, one or more electric motors 706, a power bus electrically connecting the various power sources 704, 706, and a plurality of electrical devices 710 that may be powered by the engines 704 and/or motors 706. The power system 700 includes a power distribution system 712 that distributes power 714 through power lines or cables 716. The electric motors 706 of the aircraft 702 may be configured similar to the aircraft electric motors shown and described above.

Advantageously, embodiments of the present disclosure provide for improved electric motors for aircraft and aviation applications. The aircraft electric motors of the present disclosure have improved cooling configuration that may improve cooling while eliminating or at least reducing the challenges with cooling windings of aircraft electric motors. For example, advantageously, embodiments of the present disclosure include integrated or integral oscillating heat pipes that provide an efficient mechanism for heat removal from windings of aircraft electric motors. Further, advantageously, the integral OHPs with cold plates or other structures can provide structural support or stability to the aircraft electric motors and/or components thereof.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
   a motor unit having a rotor and a stator arranged in an annular configuration with the rotor configured to rotate about a rotation axis, wherein the stator includes a plurality of windings;
   a drive unit configured to drive operation of the motor unit; and
   a cooling system comprising:
      a plurality of oscillating heat pipes, wherein each oscillating heat pipe contains a first working fluid, wherein each oscillating heat pipe is arranged to pick up heat from at least one winding, wherein each oscillating heat pipe comprises an evaporator section arranged in thermal contact with the at least one winding and a condenser section arranged away from the evaporator section; and
      a cold plate, wherein each condenser section of the plurality of oscillating heat pipes is embedded within material of the cold plate, and the cold plate comprises a heat pickup portion arranged to receive a second working fluid to remove heat from the condenser sections of the plurality oscillating heat pipes, wherein the evaporator sections of the plurality of oscillating heat pipes extend from the cold plate in a direction parallel with the rotation axis and wherein the cold plate is arranged to structurally support the stator.

2. The aircraft electric motor of claim 1, wherein the cold plate comprises one or more heat dispersion elements arranged to thermally interact with the second working fluid.

3. The aircraft electric motor of claim 2, wherein the heat dispersion elements comprise at least one of fins and pedestals.

4. The aircraft electric motor of claim 2, wherein the heat dispersion elements extend from a side of the cold plate opposite the plurality of oscillating heat pipes.

5. The aircraft electric motor of claim 1, wherein the heat pick up portion comprises at least one cooling channel formed within the cold plate and configured to receive the second working fluid.

6. The aircraft electric motor of claim 5, further comprising a pump configured to pump the second working fluid through the at least one cooling channel formed within the cold plate.

7. The aircraft electric motor of claim 5, further comprising a heat exchanger fluidly coupled to the at least one cooling channel formed within the cold plate, the heat exchanger configured to receive the second working fluid to remove heat therefrom.

8. The aircraft electric motor of claim 1, wherein the plurality of oscillating heat pipes are integrally formed with the cold plate as a unitary structure.

9. The aircraft electric motor of claim 1, wherein each oscillating heat pipe is embedded within a respective winding of the plurality of windings.

10. The aircraft electric motor of claim 1, wherein the plurality of oscillating heat pipes are arranged as an in-slot structure arranged adjacent to and in thermal contact with at least one winding and arranged within slots defined between circumferentially adjacent windings.

11. The aircraft electric motor of claim 1, further comprising a motor housing arranged about the stator, wherein the heat pickup portion is part of the motor housing.

12. The aircraft electric motor of claim 11, wherein the evaporator section of the plurality of oscillating heat pipes is arranged within the stator and the condenser section is arranged within the motor housing.

13. The aircraft electric motor of claim 11, wherein the motor unit comprises rotor having U-shaped magnets arranged about the windings of the stator.

14. The aircraft electric motor of claim 1, wherein the windings are arranged in a U-shape configuration.

15. The aircraft electric motor of claim 1, wherein the cooling system further comprises:
   a header and a heat exchanger configured to supply the second working fluid to the heat pickup portion.

16. The aircraft electric motor of claim 1, wherein the first working fluid is one of a saturated refrigerant or a dielectric refrigerant.

17. The aircraft electric motor of claim 1, wherein the cold plate is arranged as a supporting plate and is oriented in a direction normal to the rotation axis.

18. An aircraft electric motor comprising:
   a motor unit having a rotor and a stator arranged in an annular configuration with the rotor configured to rotate about a rotation axis, wherein the stator includes a plurality of windings;
   a means for driving operation of the motor unit; and
   a cooling system comprising:
      a plurality of oscillating heat pipes, wherein each oscillating heat pipe contains a first working fluid, wherein each oscillating heat pipe is arranged to pick up heat from at least one winding, wherein each oscillating heat pipe comprises an evaporator section arranged in thermal contact with the at least one winding and a condenser section arranged away from the evaporator section; and a cold plate, wherein each condenser section of the plurality of oscillating heat pipes is embedded within material of the cold plate, and the cold plate comprises a means for heat pickup arranged to receive a second working fluid to remove heat from the condenser sections of the plurality oscillating heat pipes, wherein the evaporator sections of the plurality of oscillating heat pipes extend from the cold plate in a direction parallel with the rotation axis and wherein the cold plate is arranged in a direction normal to the rotation axis and configured to structurally support the stator.

19. The aircraft electric motor of claim 18, wherein:
the means for driving operation of the motor unit comprises at least one power module system.

20. The aircraft electric motor of claim 18, wherein the plurality of oscillating heat pipes are integrally formed with the cold plate as a unitary structure.

* * * * *